US012460677B2

(12) United States Patent
Caspall et al.

(10) Patent No.: US 12,460,677 B2
(45) Date of Patent: Nov. 4, 2025

(54) SPLIT ROLLER BEARING

(71) Applicant: COOPER ROLLER BEARINGS COMPANY LTD, Norfok (GB)

(72) Inventors: Martin Caspall, Norfok (GB); Luke Mitchell, Norfolk (GB)

(73) Assignee: COOPER ROLLER BEARINGS COMPANY LTD, Norfolk (GB)

(*) Notice: Subject to any disclaimer, the term of this patent is extended or adjusted under 35 U.S.C. 154(b) by 71 days.

(21) Appl. No.: 18/277,212

(22) PCT Filed: Mar. 1, 2022

(86) PCT No.: PCT/GB2022/050539
§ 371 (c)(1),
(2) Date: Aug. 14, 2023

(87) PCT Pub. No.: WO2022/185044
PCT Pub. Date: Sep. 9, 2022

(65) Prior Publication Data
US 2024/0133429 A1 Apr. 25, 2024
US 2024/0229866 A9 Jul. 11, 2024

(30) Foreign Application Priority Data
Mar. 2, 2021 (GB) ..................... 2102922

(51) Int. Cl.
*F16C 33/60* (2006.01)
*F16C 33/64* (2006.01)

(52) U.S. Cl.
CPC ............. *F16C 33/60* (2013.01); *F16C 33/64* (2013.01)

(58) Field of Classification Search
CPC ...... F16C 9/045; F16C 23/046; F16C 33/046; F16C 33/60; F16C 33/64; F16C 33/4694; F16C 2226/70; F16C 2226/80; F16C 17/02; B23D 31/003; Y10T 29/49689
See application file for complete search history.

(56) References Cited

U.S. PATENT DOCUMENTS 3,262,185 A * 7/1966 Hornigold ............... F16C 33/58
29/418
2021/0054881 A1* 2/2021 Caspall .................. F16C 33/36

FOREIGN PATENT DOCUMENTS

DE     102013226748 A1 *  6/2015  ............ F16C 23/046
WO    WO-2019166779 A1 *  9/2019  .............. F16C 19/28

OTHER PUBLICATIONS

EPO/ISR. PCT/GB2022/050539, PCT International Search Report dated May 9, 2022, (13 pgs).

* cited by examiner

*Primary Examiner* — Alan B Waits
(74) *Attorney, Agent, or Firm* — Crawford Maunu PLLC

(57) ABSTRACT

An outer ring (5) of a split roller bearing comprising: two generally semi-circular parts (15, 16) dis-engageably engageable together to form a generally circular component via a plurality of respective co-operating contact surfaces in a saw-tooth configuration; each said respective co-operating contact surface forming a facet (21, 22, 23, 24); intersections of said facets forming peak lines (20, 26) and trough lines (25, 27) of said saw-tooth; wherein each intersection (peak or trough) line forms a respective first angle to a plane normal to the axis of the ring, and wherein each facet forms a respective second angle to a plane containing the axis of the ring. At least one of the respective first angles is between 15 and 55 degrees.

20 Claims, 5 Drawing Sheets

SPLIT ROLLER BEARING

Figure 1B:
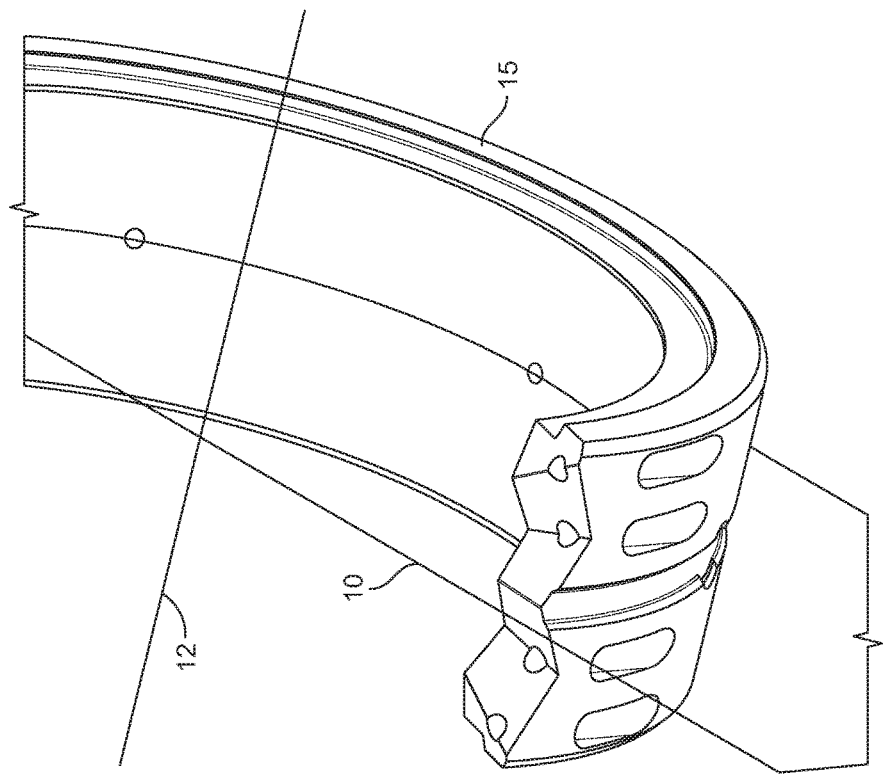

The present invention relates to an improved split roller bearing. In particular the present invention relates to an improved outer ring of a split roller bearing and a method of manufacturing the same.

Split roller bearings of conventional design employ inner and outer rings between which a series of rollers are held in a spaced apart relationship by a cage. The rollers are locatable on rolling surfaces of the rings or in roller tracks formed in the rings. The bearing is made to separate into two approximately equally sized halves and each half of the bearing is then composed of semi-circular inner and outer ring components and a semi-circular cage component. Split roller bearings are used in many applications including propulsion shafts of ships, conveyor drums, industrial fans, mixers and so on.

When reassembling a split bearing, it is important that accurate alignment of the respective halves of the inner and outer rings is achieved. The inner ring is generally clamped or otherwise secured to the shaft around which the bearing is positioned, and alignment of the two halves of the inner ring is accommodated as part of this process. The outer ring is not secured in this manner, and there are particular problems associated with conventional approaches relied upon to align the two outer halves in respect of split roller bearings.

One conventional approach adopted to align the two outer ring halves includes joining the two outer halves together by dowels or shoulders on joint screws, however a problem with this approach is that accurate openings must be formed within the respective outer ring halves to receive the dowels or joint screws.

Another conventional approach is to divide the outer ring into two approximately equal parts via a V'-shaped split where the two halves rest against each other and there is no mechanical connection securing the two halves together. This arrangement is satisfactory when the bearing is 'fixed', i.e., when the bearing is positioned within a housing adapted to receive the bearing, the housing being sized to receive the bearing with little 'play' for the bearing to move within the housing. Such a fixed bearing provides for axial location of the shaft. However, some bearings are not fixed (for example when there is more than one bearing on a shaft and it is desirable for only one of the bearings to be fixed and for the remaining bearings to be free to move axially to accommodate for example thermal expansion of the shaft during use) and in such cases the lack of a mechanical connection between the two halves can result in the two halves wedging apart in the housing.

An alternative is for the two halves to be aligned by relying on a 'W' shaped split, wherein the split surfaces comprise a plurality of facets that cooperate to position the ring when the ring is reformed.

In cases where it is necessary to allow for the outer ring to move within the housing it can be advantageous to provide a shroud to surround the outer ring to support alignment of the two halves of the ring both in the axial and radial directions and to hold the two halves of the ring together to prevent them wedging apart in the housing, as for example set out in EP19708620.0, however having such a shroud adds a layer of complexity to the process. While this may be avoided by having a thick outer ring incorporating means of securing the two halves of the ring together, and possibly using some combination of keyways, dowels, etc., this system has disadvantages. For example, keyways and dowels line the two halves up only to the machining tolerances of the features, it is challenging to provide for them in hard materials, and machining features when the material is in a soft state loses accuracy upon heat treatment.

The present invention is directed to address the difficulties associated with accurate alignment of the two ring halves and maintaining this alignment in use.

In particular the present invention is directed to an outer ring of a split roller bearing comprising two generally semi-circular parts dis-engageably engageable together to form a generally circular component via a plurality of respective co-operating contact surfaces in a saw-tooth configuration. Each respective co-operating contact surface forms a facet with intersections of the facets forming peak lines and trough lines of the saw-tooth. Each intersection (peak or trough) line forms a respective first angle to a plane normal to the axis of the ring, with each facet forming a respective second angle to a plane containing the axis of the ring.

Preferably the intersection lines converge at a point.

Preferably the convergence point is within the bore of the bearing such that the contact surfaces are outwardly splayed surfaces.

Preferably the convergence point is external to the bore of the bearing such that the contact surfaces are inwardly splayed surfaces.

Preferably at least one of the respective first angles is between 15 and 55 degrees, and/or 25 and 40 degrees.

Preferably the second angle is between 15 and 50 degrees, and/or 25 and 40 degrees.

Preferably the intersections include a central intersection where the first angle is zero.

Preferably the contact surfaces are planar.

Preferably each contact surface is urged towards and retained against the corresponding respective contact surface via the splayed nature of the respective contact surfaces.

Preferably the plurality of respective cooperating contact surfaces provides for two joints, each joint including between 4 and 8 contact surfaces.

Preferably each joint includes 6 contact surfaces.

Preferably the plurality of cooperating contact surfaces includes inner and outer facets of the saw tooth, with the inner facets separated by a gap.

Preferably the parts are attachable together via engagement means positioned at respective peaks and troughs.

Preferably the engagement means are screws or bolts.

The present invention is further directed to a method of manufacturing an outer ring of a split roller bearing including carrying out a cutting step on an outer roller bearing ring to form two generally semi-circular parts dis-engageably engageable together to re-form the bearing, the cut path providing for a plurality of respective cooperating contact surfaces in a saw tooth configuration, wherein each respective cooperating contact surface forms a facet, and wherein intersections of the facets form peak lines and trough lines of the saw-tooth. Each intersection (peak or trough) line forms a respective first angle to a plane normal to the axis of the ring and each facet forms a respective second angle to a plane containing the axis of the ring.

Preferably the cutting step comprises a cut of approximately consistent thickness along the cut path.

Preferably the cutting step comprises a cut of varying thickness adapted to compensate, along the cut path, for the different angle of the direction of the cut in relation to the direction of engagement of the joint.

Preferably the cut thickness is maintained at approximately constant thickness over the outer pair of facets at each end of each joint, but the cut thickness is greater over inner facets, wherein approximately constant corresponds to within 20 microns, within 10 microns, or within 5 microns accuracy.

Preferably the cutting step is carried out by electro-discharge-machining (EDM).

Preferably the EDM cutting machine has a first head and guide and a second head and guide and during the cutting operation one of the heads enters into the bore of the part.

Preferably engagement means are provided in the cut surface, a centre of each engagement means being provided approximately coincident with the peaks and troughs.

Preferably the engagement means are openings adapted to receive screws or bolts.

Figure 1A:
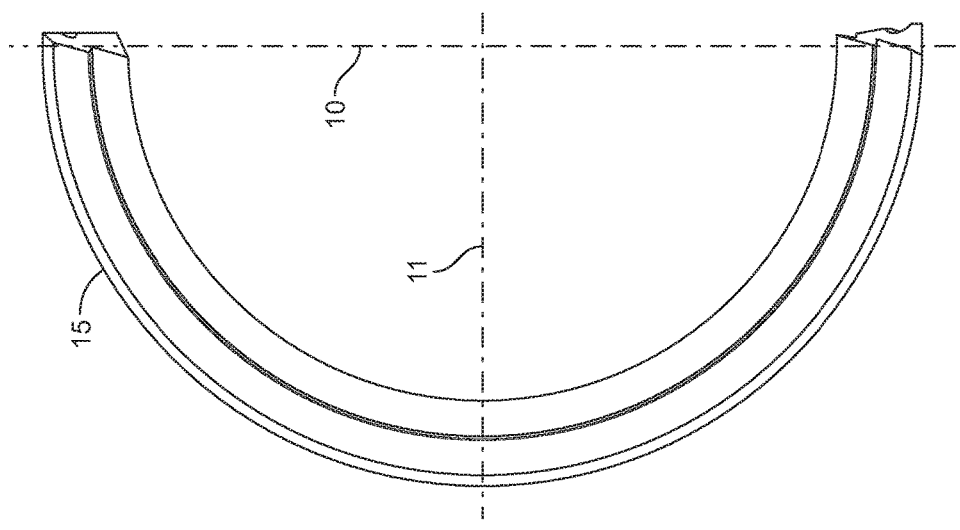
Figure 1C:
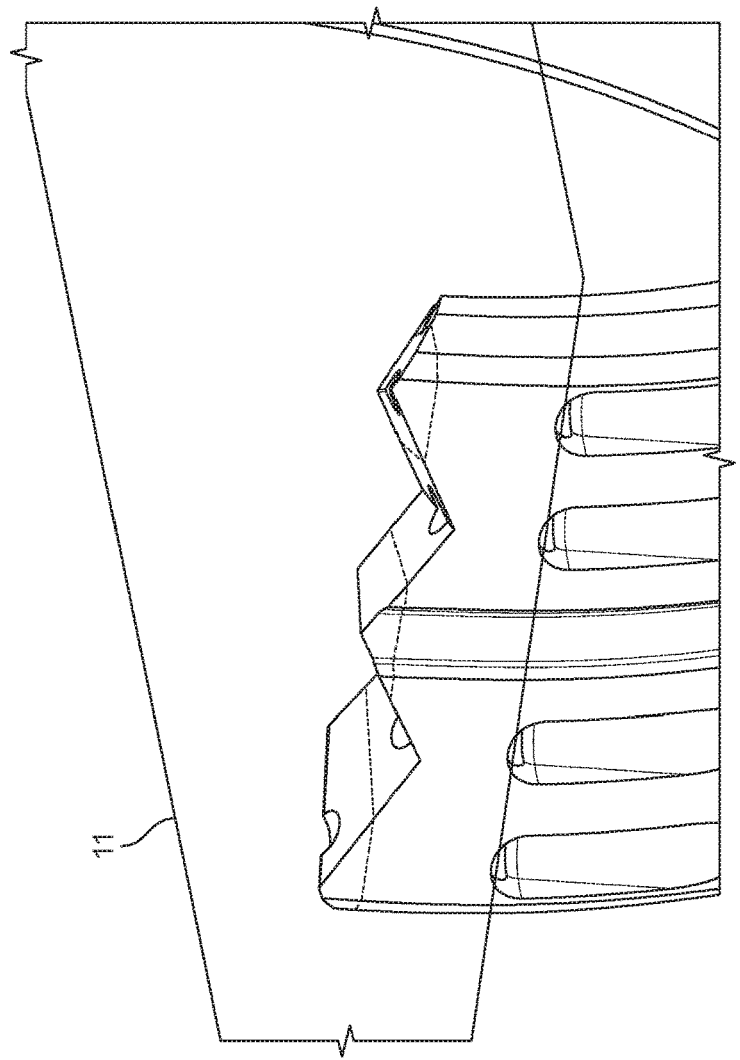
Figure 1D:
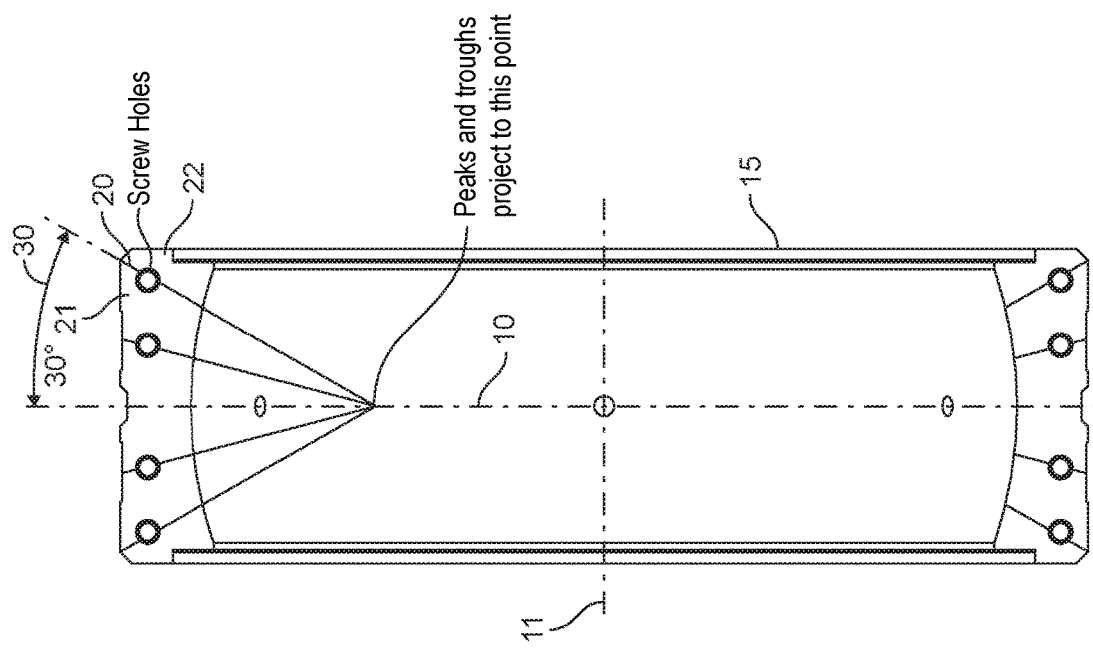
Figure 3:
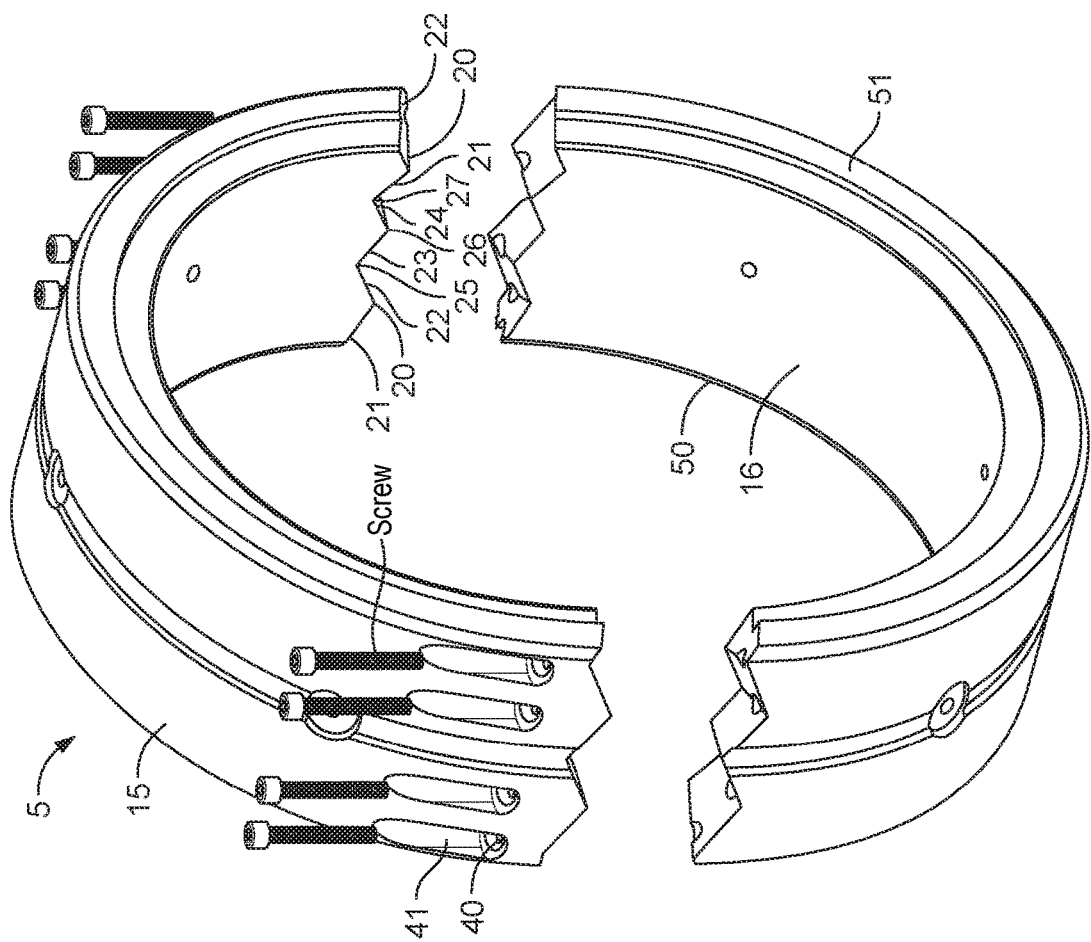
Figure 2:
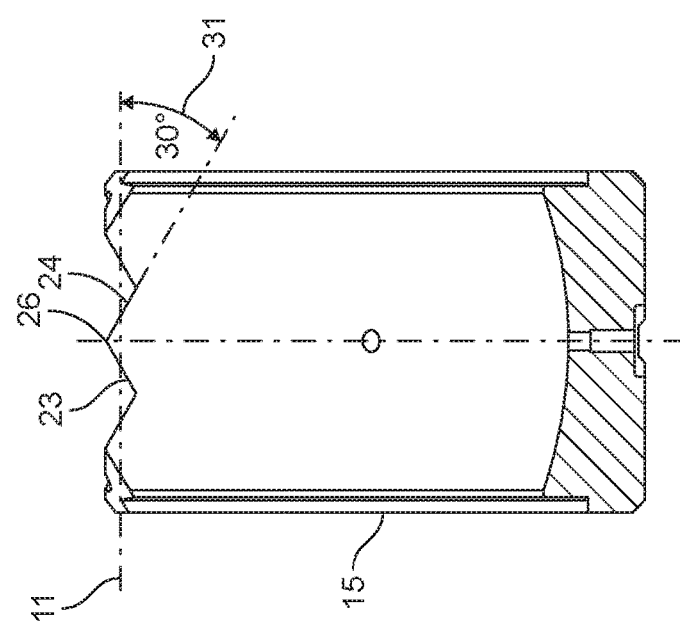
Figure 5:
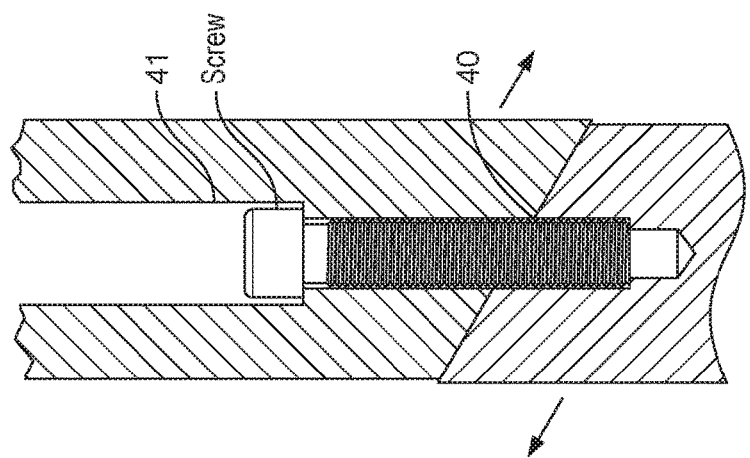
Figure 4:
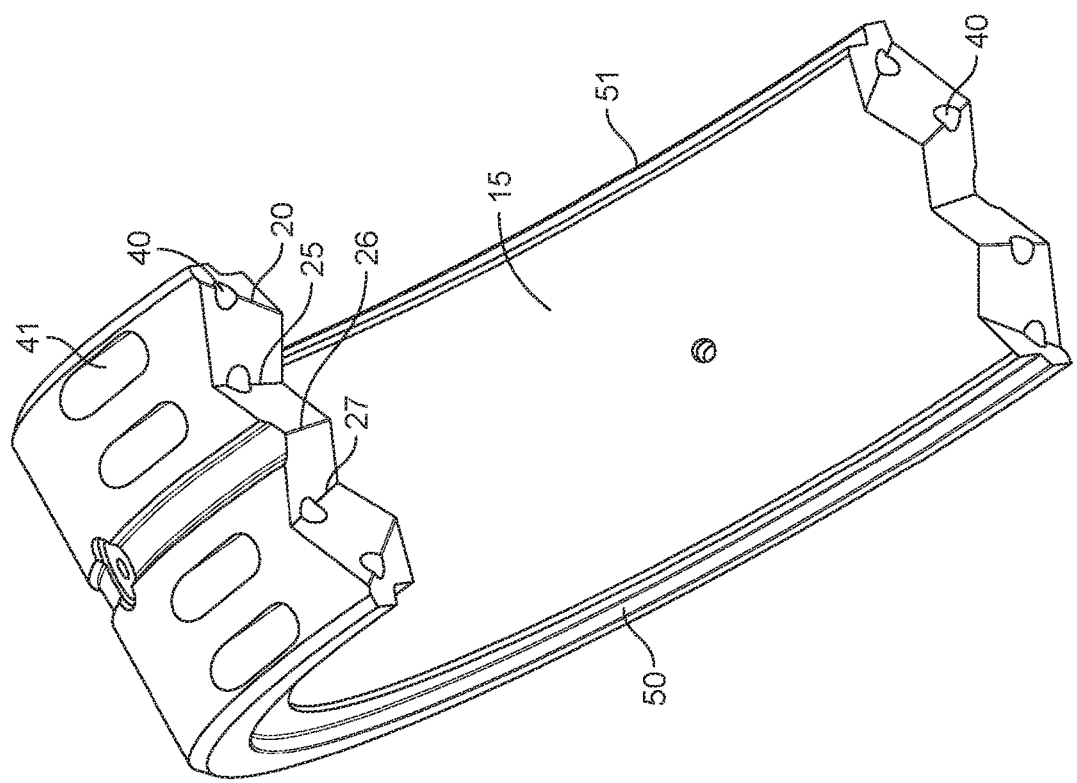
Figure 6A:
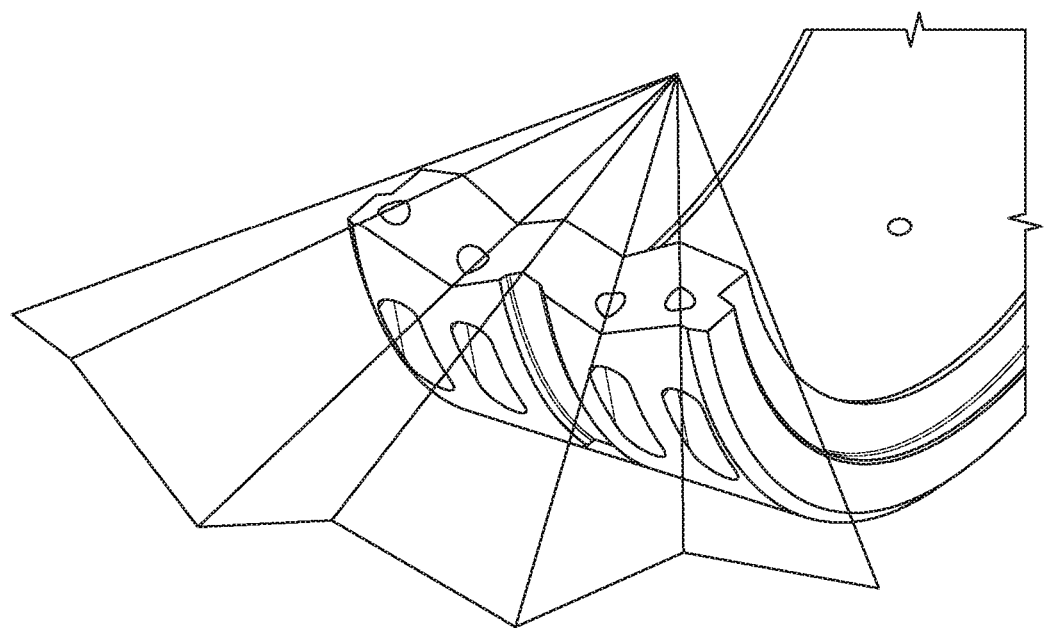
Figure 6B:
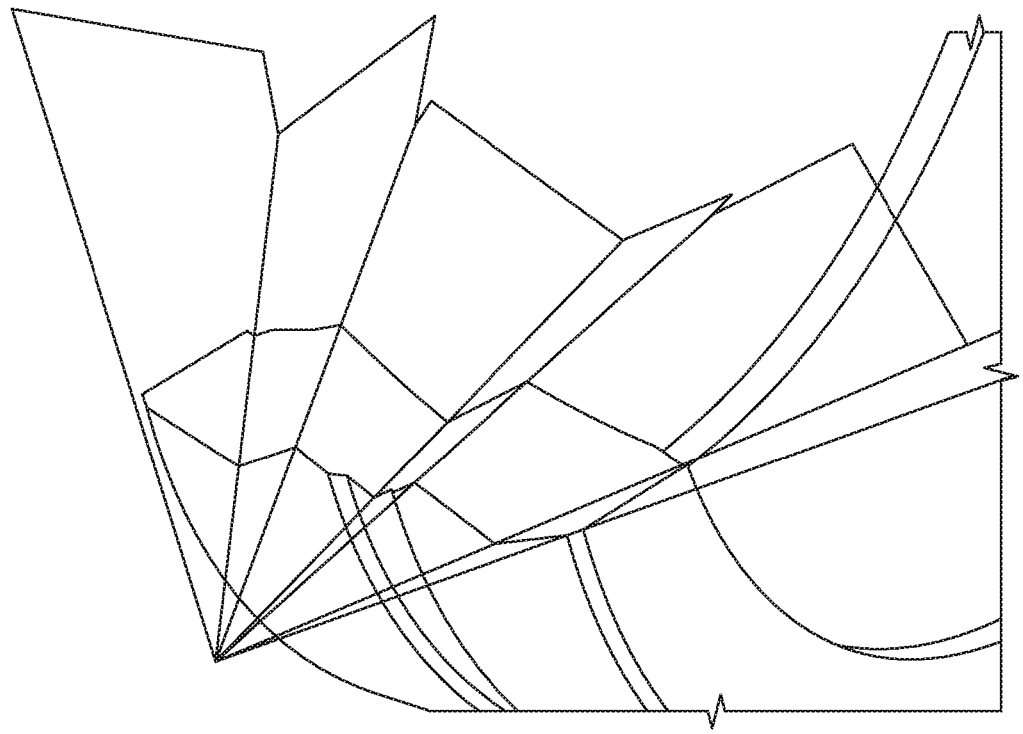

Preferred embodiments of the present invention will now be described by way of example only and with reference to the accompanying drawings in which:

FIG. 1A shows a side view of one half of a split bearing ring in accordance with the present invention, FIG. 1B shows a perspective view of the ring of FIG. 1A showing a plane normal to the axis of the ring, FIG. 1C shows a perspective view of the ring of FIG. 1 showing a plane containing the axis of the ring, FIG. 1D shows a view of the ring of FIG. 1A rotated through 90°, FIG. 2 shows a sectional view of the ring of FIG. 1A, illustrating the zig-zag formation of the joint, FIG. 3 shows an exploded view of a ring comprising respective halves as set out in FIG. 1A, FIG. 4 shows a perspective view of the half ring of FIG. 1A, FIG. 5 shows a detail of a ring arrangement with engagement means, FIGS. 6A and 6B show the 'splayed outwards' and 'splayed inwards' arrangements, respectively.

FIGS. 1A and 1B show a plurality of facets comprising the contact surfaces of a 'zig-zag' shaped split at the cut ends of one half of a split bearing ring. FIG. 1A shows a side view, indicating the plane 10 normal to the axis of the ring 5, and a plane containing the axis of the ring 11, when the ring is reformed. FIG. 1B shows the ring of FIG. 1A indicating the plane 10 normal to the axis 12 of the ring. FIG. 10 shows the ring of FIG. 1A indicating a plane 11 containing the axis of the ring.

FIG. 1D shows a detail of the zig-zag shaped split including facets (identified as 21, 22, 23, 24 in FIG. 3) of the split surface. FIG. 1D shows that each pair of facets 21, 22 adjacent to outer edges 50, 51 of the ring 5 intersect at a peak 20, the intersection at peak 20 forming an angle 30 to the plane 10 normal to the axis of the ring. It is contemplated that an angle of between 25° and 40° provides for the optimum outcome.

It is to be noted that in accordance with the present invention the intersections 20 of these outermost facets do not generally form lines (peaks and troughs) radial to the axis of the ring, but usually at an angle thereto. However, in the circumstance that the point of convergence of the intersections falls at the centre (i.e. a central intersection 26), the peaks and troughs would be radial.

The angle of between 25° and 40° has the advantage that it provides for friction between the surfaces to be overcome and is self-aligning. In particular, if the angle is too shallow (i.e., less than approximately 25°) then regardless of any effort made to tighten them together, the friction between the surfaces prevents them sliding into alignment of their own accord. However, if the angle is between 25° and 40°, then the appropriate component of the force between the two surfaces is greater than the friction force so the two surfaces slide over each other until the peaks and troughs engage correctly.

FIG. 2 shows a further detail of the ring of FIGS. 1A to 1D, showing the zig-zag formation of the joint, in particular showing a side view of each facet. As can be seen from FIG. 2, the zigzag provides for a central pair of facets 23, 24, as well as pairs of facets 21, 22 (seen in FIG. 3) adjacent the outer edges of the ring, and any other facets (not shown) that may be provided intermediate the central and outermost facets.

As can be seen in FIG. 2, the facets are at a further angle 31, of between 25° and 40°, to a plane containing the axis of the ring.

FIG. 2 provides for one example of a zigzag in accordance with the present invention, i.e. one with six facets only, but applies similarly to intersections between all pairs of facets where more than 6 facets are present. In particular all intersections contemplated differ from conventional intersections in that the intersections generally form an angle of between 25° and 40° to a plane 10 (as shown in FIG. 1B) normal to the axis of the ring, in addition, facets forming respective intersections also generally form an angle of between 25° and 40° to a plane 11 in which the axis of the ring lies (as shown in FIG. 10).

While the intersections are in general at these angles, the invention also provides for the possibility that a subset of the intersections have angles that are zero.

As an example, it is contemplated that for at least one intersection, the angle of the intersection to the plane 10 normal to the axis of the ring, is zero.

In particular, it is contemplated that in some embodiments the angle of the central intersection to the plane normal to the axis of the ring may be zero.

FIG. 3 shows a split outer ring 5 in accordance with the present invention, showing each half 15, 16 and the zig-zag joint. FIG. 3 provides details of the joint, including facets 21, 22, 23, 24. In this case 6 facets are shown but it is contemplated that a different number of facets may be relied upon. FIG. 3 also shows the intersections 20, 25, 26, 27 (peaks and troughs) where the facets intersect. It can be seen that the intersections are at respective angles to the plane 10 normal to the axis of the ring, and that the facets are at further respective angles to a plane 11 containing the axis of the ring.

FIG. 4 shows one half 15 of the split outer ring, showing more detail. In particular FIG. 4 shows further means to join the halves together, namely openings 40 in the contact surfaces which are positioned at the intersections 20, 25, 26, 27 such that screws introduced into channels 41 enter into the openings 40 to secure the two halves together: the more tightly the screws are engaged, the more firmly the two contact surfaces are engaged, the two contact surfaces balancing the forces to push in opposite directions. As can be seen from FIG. 4, it is contemplated that the central intersection does not include an opening, nor provision for engagement of this with the corresponding intersection in the other half of the ring, via a screw or any other engagement means. In addition, it is contemplated that in some applications, all such channels and openings may be optional, in particular it is contemplated that the arrangement may be put into effect without such engagement means.

The cut splitting the ring into two halves is contemplated to be a cut of constant thickness throughout the cut path, however this is not essential to ensure the joint is aligned, and also is not essential to the present inventive concept.

In addition, if a cut of constant thickness is relied upon, it is not necessarily the case that all the facets touch together when the two halves of the ring are placed together to reform the ring.

For example, as the two halves approach each other to join together to reform the ring, a facet on one half of the ring may make contact with the corresponding facet on the other half at a different time to another pair of facets, even if the cut is geometrically perfect. If a ring is split by making a simple cut normal to the direction of engagement of the two halves, i.e., it is simply cut along a plane containing the axis of the ring, then the distance the two halves must be moved to re-butt them together is the thickness of the cut. If, instead, the splitting cut is made at an angle to the plane containing the diameter of the ring, but the parts are still moved together in a radial direction the distance the parts must be moved is now greater than the thickness of the cut because the effective thickness of the cut in the direction in which the parts are moved together is greater than the actual thickness of the cut. If we consider a cut which is of perfectly constant thickness, for example created by removing the thickness of a taut wire as it passes through the part, and the cutting process is controlled perfectly accurately to create the angled facets, it is clear that the wire is at a different angle as it cuts each facet, being more nearly radial in the centre facets, and at a greater angle as it cuts the outer facets. Consequently, if the parts are now moved to re-butt them, even though they have been cut with a cut of constant thickness, the effective cut thickness in the direction of engagement is actually different between the different facets, so certain facets will engage first and unless the part is deformed other facets will be held out of engagement. This can have a significant effect on the effectiveness of joint alignment even if the gap is only a matter of microns. It seems likely that the central, less effective, facets engage first, and since they don't align the halves effectively the relative positions of the halves can lie anywhere between the extremes that the gaps in the outer facets allow.

In addition, the cut thickness will inevitably vary slightly according to for example the thickness of the material being cut, resulting in a variation throughout the cut.

The best alignment of the two halves in a radial direction may be achieved when the four outer facet pairs engage first, i.e., before the inner facet pairs. Therefore it is contemplated that the pair of central facets may be cut slightly thicker, i.e. with a wider gap, so that both outermost pairs of facets (on each outermost edge 50, 51 of the ring) which form the greater angle with the plane normal to the axis of the ring (see for example FIG. 1D), and therefor provide better alignment, touch before the central facets.

FIG. 5 shows an arrangement wherein the engagement means 40, 41 are not positioned at the peaks and troughs of the join, but for example are positioned in the middle of a facet.

As the engagement means, such as a screw, is tightened, the upper half of the ring tends to slide down the facet as shown in the arrows in FIG. 5. Although the remaining facets act to restrain this tendency by interlocking and aligning the two halves of the ring as desired, a local misalignment can result from this feature.

An advantage of the present approach is that the precision of the cutting arrangement is not critical. For example, provided the method of cutting provides for a consistent thickness of cut, the geometry of the cut does not need to be significantly accurate. In particular, if a cut is a couple of millimetres out of position, or if the angle of one of the facets is for example 29° instead of 30°, or if one peak is higher than another, the join will provide for an interlocking and self-aligning geometry provided the cut is of a consistent thickness.

In fact, if the angle is different between respective facets this will result in a different effective width of cut, which could cause misalignment as certain facets of the joint might engage before others. As in the example already discussed, if one facet is cut at 29° instead of 30° then strictly speaking a different effective width of cut is achieved. In particular cutting at 29° instead of 30° will mean that the cut is well out of position at least on some part of the cut path, however the error in alignment caused by this is a small fraction of any positional error in cutting. By contrast, if a keyway is being cut, then the potential alignment error is directly related to the positional error of the cut. Thus the error in alignment is of a much smaller magnitude than the error in geometry which causes it. For example, such a misalignment is unlikely to be greater than about 5 microns.

The cuts shown by FIGS. 1-4 include intersections (peaks and troughs) which converge on a theoretical point, shown in FIGS. 6A and B. In FIG. 6A the lines converge at a point within the bore of the part: the facets resulting from the cut are shown forming planes between the peaks and troughs. This creates a geometry in which the cut 'splays outwardly'. In FIG. 6B the peaks and troughs converge at a theoretical point outside the part. This creates a geometry in which the cut 'splays inwardly'.

In the 'splayed outwardly' arrangement, the planes are closer to perpendicular to the bore of the ring on which the rollers run, which is contemplated to be a more desirable outcome. In the 'splayed inwardly' arrangement some of the planes of the joint form fairly acute angles with the or any roller track, which may result in a point of weakness.

The invention also relates to a method of manufacturing such a split outer ring.

First, and conventionally, the ring undergoes initial machining as a complete ring. This includes an initial turning operation (not to finished size) and machining of such features a joint screw holes (if to be used) and any lifting and lubrication holes as required. In addition, any openings 40, 41 which may later be relied upon are machined at this point.

The ring is then cut by wire-EDM (Electro Discharge Machining). The machine conventionally has an upper head and guide and a lower head and guide between which a wire is continuously passed. The wire is presented to the part, which is immersed in deionised water, and an electrical discharge between the wire and the part erodes away the part. Generally, the part is kept in one position whilst the upper and lower guides of the machine move to create the required cut geometry.

The cut is contemplated to be in the form of a straight line at any one instant (since it is formed by a taught wire) but there is no need for it to be prismatic as it is not necessary to move the top and bottom heads of the machine in the same paths. The wire is not then vertical and will be at different angles at different instants during the cut.

In the present case the EDM machine relied upon includes the feature that the top head can go inside the bore of the part, allowing each joint to be cut independently. This is not entirely conventional as in most EDM machines the top head is above the top part of the item to be cut, and the bottom head is below the item to be cut, meaning that it would not be possible to achieve independent cutting of each joint, as required in the present case.

For each joint, the cut is contemplated to be of approximately constant thickness along the cut path. In most cases the variation is only a few microns.

It is contemplated that the cutting step may comprise a cut of varying thickness along the cut path to compensate, along the cut path, for different angles of the direction of the cut in relation to the direction of engagement of the joint, as explained above.

It is further contemplated that the cut thickness of each pair of facets on an outer edge of the bearing is thinner than the cut thickness of each innermost pair of facets, allowing for the pair of facets on the outer edge of the bearing to make contact first when the two halves of the ring approach each other to reform the ring. Such an arrangement provides for a more secure alignment of the two halves and a more secure seating of the two halves together.

In use a ring may be prepared to be split by initially machining the ring to include any openings such as for introducing lubricant into the bearing or for screw holes and so on. An EDM machine, adapted to cut each joint separately may then be utilised to cut the ring into two generally equal halves. The cutting surface provides for generally planar contact surfaces between the two halves, the intersections of respective planar surfaces forming peaks and troughs in a zig-zag arrangement, the respective planar surfaces providing for facets of the joint.

The cutting process provides for the intersections (peaks or troughs) to be at an angle to a plane normal to the axis of the ring, when reformed. In addition, the cutting process further provides for the facets to be at a respective angle to a plane including the axis of the ring, when reformed.

The cutting process provides for a cut surface that may be of consistent thickness along the cut path, however it is contemplated that the thickness of the cut path may vary, as explained above. Any such variation tends conventionally to be minimal, a few microns at the most. It is contemplated that the variation in the thickness of the cut path may provide for the outermost pair of corresponding facets to engage together earlier than any innermost pair of facets, as this is likely to result in optimal alignment in an axial, and a radial, direction. The tendency in EDM machines is to create a wider cut in thicker material, which is the opposite way round to that which is desirable in the present invention, since on the outer facets, which preferably engage first, the material being cut is thicker, and the angle of the cut is greater (which also gives an effectively wider cut). The preferred variation in the cut thickness in accordance with the present invention would need to be induced deliberately by altering the cutting parameters to cut thicker of the centre facets; it does not occur "naturally".

The invention is not restricted to the details of the foregoing embodiments. For example, the halves may not necessarily be equal. The contact surfaces may not necessarily be planar. The angles formed by the peak and trough lines to the plane normal to the axis of the ring, when reformed, may be between 15° and 55°. The angles formed by the facets to a plane including the axis of the ring when reformed, may be between 15° and 55°.

The invention claimed is:

1. An outer ring of a split roller bearing comprising:
    two semi-circular parts dis-engageably engageable together to form a circular component via a plurality of respective co-operating contact surfaces in a saw-tooth configuration;
    each said respective co-operating contact surface forming a facet;
    intersections of said facets forming peak lines and trough lines of said saw-tooth; and
    wherein each peak line and each trough line forms a respective first angle to a plane normal to the axis of the ring, wherein at least one of said respective first angles is between 15 and 55 degrees, and wherein each facet forms a respective second angle to a plane containing the axis of the ring.

2. The outer ring of the split roller bearing of claim 1 wherein said intersection lines converge at a point.

3. The outer ring of the split roller bearing of claim 2 wherein said convergence point is external to the bore of the bearing such that said contact surfaces are inwardly splayed surfaces.

4. The outer ring of the split roller bearing of claim 2 wherein said convergence point is within the bore of the bearing such that said contact surfaces are outwardly splayed surfaces.

5. The outer ring of the split roller bearing of claim 4 wherein each said contact surface is urged towards and retained against said corresponding respective contact surface via said splayed surfaces of said respective contact surfaces.

6. The outer ring of the split roller bearing of claim 4, wherein each said contact surface is urged towards and retained against said corresponding respective contact surface via said splayed surfaces of said respective contact surfaces.

7. The outer ring of the split roller bearing of claim 1 wherein at least one of said respective first angles is between 25 and 40 degrees.

8. The outer ring of the split roller bearing of claim 1 wherein said second angle is between 15 and 50 degrees.

9. The outer ring of the split roller bearing of claim 1 wherein said intersections include a central intersection where said first angle is zero.

10. The outer ring of the split roller bearing of claim 1 wherein said contact surfaces are planar.

11. The outer ring of the split roller bearing of claim 1 wherein said plurality of respective cooperating contact surfaces provides for two joints, each joint including between 4 and 8 contact surfaces.

12. The outer ring of the split roller bearing of claim 11 wherein each joint includes 6 contact surfaces.

13. The outer ring of the split roller bearing of claim 1 wherein said parts are attachable together via engagement means positioned at respective peaks and troughs.

14. The outer ring of the split roller bearing of claim 13 wherein said engagement means are screws or bolts.

15. The outer ring of the split roller bearing of claim 1 wherein said second angle is between 25 and 40 degrees.

16. A method of manufacturing an outer ring of a split roller bearing including:
    carrying out a cutting step on an outer roller bearing ring to form two semi-circular parts dis-engageably engageable together to re-form the bearing, the cut path providing for a plurality of respective cooperating contact surfaces in a saw tooth configuration, wherein each respective cooperating contact surface forms a facet, and wherein intersections of said facets form peak lines and trough lines of said saw-tooth; and
    each peak line and each trough line forming a respective first angle to a plane normal to the axis of the ring, wherein at least one of said respective first angles is between 15 and 55 degrees, and each facet forming a respective second angle to a plane containing the axis of the ring.

17. The method of claim 16 wherein the cut thickness is maintained at approximately constant thickness over the outer pair of facets at each end of each joint, but the cut thickness is greater over inner facets, wherein approximately constant corresponds to a thickness within 5 microns accuracy.

18. The method of claim 16 wherein the cut thickness is maintained at approximately constant thickness over the outer pair of facets at each end of each joint, but the cut thickness is greater over inner facets, wherein approximately constant corresponds to a thickness within 20 microns accuracy.

19. The method of claim 16 wherein the cut thickness is maintained at approximately constant thickness over the outer pair of facets at each end of each joint, but the cut thickness is greater over inner facets, wherein approximately constant corresponds to a thickness within 10 microns accuracy.

20. The method of claim 16 wherein said cutting step is carried out by electro-discharge-machining (EDM).

* * * * *